R. L. B. RATHBONE AND C. MORTON.
MANUFACTURE OF MODELS.
APPLICATION FILED OCT. 8, 1920.

1,382,607.

Patented June 21, 1921.

Inventors
R.L.B. Rathbone
C. Morton
Marks & Clerk
Attys

UNITED STATES PATENT OFFICE.

RICHARD LLEWELYN BENSON RATHBONE, OF LONDON, AND CAVENDISH MORTON, OF THORNTON HEATH, ENGLAND.

MANUFACTURE OF MODELS.

1,382,607. Specification of Letters Patent. Patented June 21, 1921.

Application filed October 8, 1920. Serial No. 415,565.

*To all whom it may concern:*

Be it known that we, RICHARD LLEWELYN BENSON RATHBONE, a subject of the King of Great Britain and Ireland, residing at 3 Ravenscourt Square, Hammersmith, London, W., England, and CAVENDISH MORTON, a subject of the King of Great Britain and Ireland, residing at 33 Torridge road, Thornton Heath, in the county of Surrey, England, have invented certain new and useful Improvements in and Relating to the Manufacture of Models, for which we have filed an application in Great Britain No. 20770 dated 23rd Aug. 1919, of which the following is a specification.

The present invention relates to the soldering of joints and has for its object the making of such joints in a simple and expeditious manner and with the minimum waste of solder.

It is more particularly concerned with materials for use in model making and especially models of a type which are required quickly but are only intended to be of a temporary nature.

The object of the invention is the provition of materials from which metal models can be rapidly constructed, these materials being designed to carry within themselves the solder necessary for making joints required between the various parts of the model, thus obviating the necessity for the external application of solder and necessitating the minimum amount of skill.

The invention consists in metal model-making strips having one or more recesses containing solder integral with the strip itself whereby a soldered joint can be readily made by the application of heat together with a suitable flux.

The invention further consists in the improved means for making soldered joints in models hereinafter described.

Referring to the accompanying drawings:—

Fig. 4 shows a rectangular section, while

Figure 1:
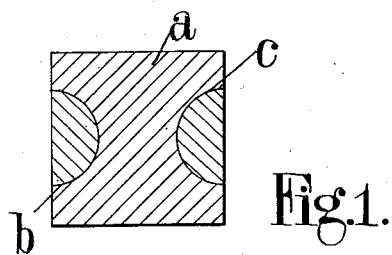
Figures 1, 2 and 3 are cross sections of square wire having grooves containing solder.

Our improvements are applicable to model-making members of any shape but the most generally useful form of member in connection with which the invention may be employed is that of a strip and it is in its application to this type of member that our invention will be described, it being understood that the term "strip" is intended to cover sections other than rectangular, for example, circular or elliptical.

In one manner of carrying the invention into effect, we form strips of copper, brass or other suitable metal with depressions, recesses or the like of a form appropriate for the particular work to be executed. These recesses are then filled with solder or like material integral with the strip, thus forming a composite strip which may be by using a suitable flux, soldered at any point in its length to another member. In using the strip to make a model it is heated by any suitable means either in sections or all at once according to its size and shape, the solder being thereby melted and flowing in and around the joint.

The form of the metal strip will vary according to the work in hand. The depressions in it may take the form of separate recesses, but we have found that a very successful form of strip is one in which one or more grooves are provided for the accommodation of the solder.

The position and number of these grooves will vary in accordance with the shape and relative positions of the joints required. For example, if it be required to connect two plates edge to edge a strip having a single groove may be used, the groove being of sufficient width to give the solder therein a hold on each plate. If, however, two plates are to be joined at right angles, we should employ a strip of approximately square section having grooves on two adjacent sides.

In a case in which it is desired to join two parallel plates the grooves would obviously be placed at opposite sides of the strip.

The method may be readily applied to the joining of cylindrical objects such as rods, tubular members, etc., by winding a suitably formed strip in a helix around the ends of the cylinders and then heating in the manner above described.

In the case of tubes it may be desirable to place a coil of strip either within or without the tubes, or both. Further, tubes of different diameters may be successfully joined by placing a coil of strip of suitable thickness and having grooves on two opposite sides in the annular space between the tubes, thus forming a lap joint.

In the manufacture of the composite strip, we roll, draw or otherwise form the requisite number of grooves in the strip, fill these grooves with solder in any suitable manner, together with a flux to cause it to adhere to the sides of the groove, and if desired subsequently roll or draw the complete strip so formed to any required size.

We may if desired undercut the sides of the groove or form projections thereon to assist in retaining the solder; or this method may replace the use of flux entirely for this purpose.

In using the term "strip" we do not confine ourselves to any particular form of cross section; this will be determined by the kind of work to be performed. For example, we might make the strip of triangular, hexagonal, circular or any other appropriate cross section.

Various examples of strip suitable for carrying the invention into effect are shown in the accompanying drawings.

Figure 2:
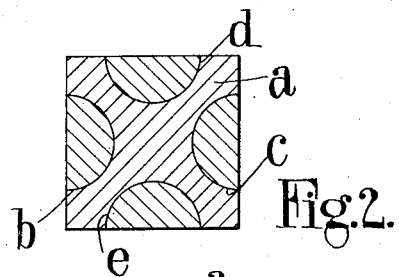
Figure 3:
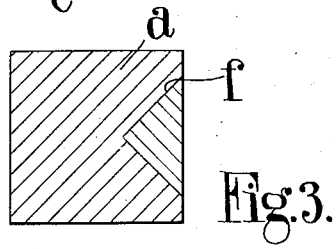
Figure 4:
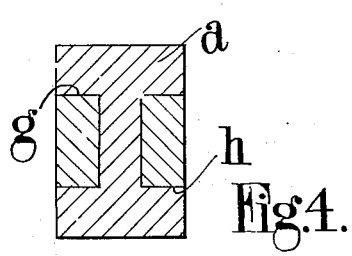
Figure 5:
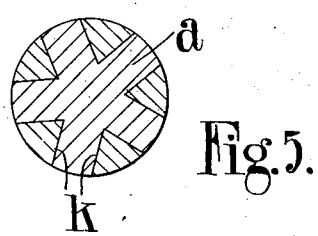
Fig. 5 shows a wire of circular section, all the sections being shown to a very enlarged scale.

In Figs. 1, 2 and 3, the strip or wire $a$ is of square section, and in the case of Fig. 1, two semi-circular grooves $b$, $c$ are provided on the two sides. In Fig. 2 four semi-circular grooves $b$, $c$, $d$, $e$ are provided, one on each surface of the wire. In Fig. 3 one triangular groove $f$ is provided. In Fig. 4 the wire $a$ is of rectangular section with rectangular grooves $g$ $h$ on each side, while in Fig. 5 the wire $a$ is of circular section with five triangular grooves $k$. In each case the grooves are filled in with solder to form the original section of the wire.

It will be seen that in the method of soldering described the solder is completely enclosed by the sides and bottom of the recesses or grooves and the surfaces which are being joined, thus making the joint with a minimum waste of solder and requiring little or no skill in the operation.

Figure 6:
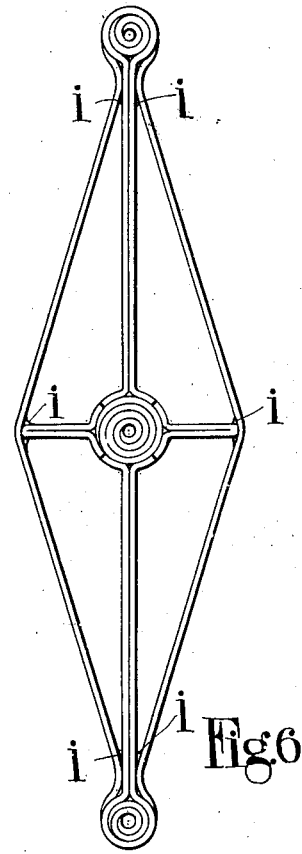
Fig. 6 shows a model made in accordance with the present invention and Fig. 7 depicts a small portion of this model to an enlarged scale.
Figure 7:
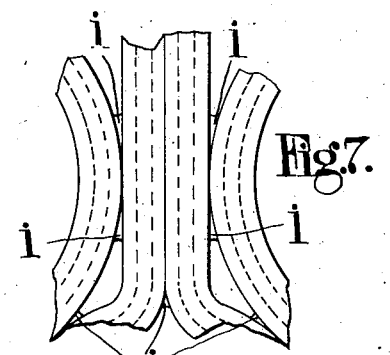

Owing to the fact that the solder is embedded in one or both of the members to be joined, a copious supply is obtained exactly where required, namely, at the joint, thus making it feasible to execute work on members so minute that their junction by means of solder would be impossible, or only attainable with the exercise of very great skill, were the ordinary method of the introduction of solder or the application of solder by means of a soldering iron adopted. Particularly in connection with the execution of models in which a strip of very small section is employed, this copious supply of solder, which, by means of capillary attraction tends to run along the grooves toward the joint, results in the production of a comparatively strong joint. This is particularly the case where members are joined to form an angle, the solder in this instance forming itself, owing to the action of surface tension, into a neat radius in the angle between the members. This effect is illustrated in Figs. 6 and 7. The model shown in Fig. 6 is of the beam of a beam engine drawn approximately to twice the size of the model as actually constructed. The model is constructed of nine separate pieces of wire which might advantageously be of the sections shown in Figs. 1 or 4, bent to shape, heat being then applied by any suitable well known manner at the points at which the various members are in contact. It will be obvious, however, that whatever means may be employed it is not possible to localize the heat entirely at the joints and that, therefore, a certain amount of solder in the neighboring parts of the grooves will become melted and, as the result of surface tension, will form itself into a radius such as is indicated at $i$ in the angles existing between the various members. This effect is most clearly illustrated in Fig. 7, which shows a fragment of the model to a considerably enlarged scale.

Having now described our invention, what we claim as new and desire to secure by Letters Patent is:—

1. An article of manufacture comprising a flexible rod having at least one recess containing solder integral with the rod.

2. An article of manufacture of the kind defined by claim 1 in which the rod is formed of a material having substantially the same flexibility as the solder.

3. An article of manufacture of the kind defined by claim 1 in which the rod is formed of copper and in which the recess and solder extend longitudinally of the rod.

4. In combination, a rod provided with a longitudinally extending recess containing solder integral with the rod, a second rod bent intermediate its ends and provided with a longitudinally extending recess containing solder, the solder at the bended portion of the second mentioned rod abutting the solder in the first mentioned rod and the solder at the bended portion extending beyond the abutting portions of the rods to form a strong joint.

In testimony whereof we have signed our names to this specification.

RICHARD LLEWELYN BENSON RATHBONE.
CAVENDISH MORTON.